Aug. 24, 1965

F. McCULLOUGH, JR 3,202,386

AERIAL CARGO DELIVERY DEVICE

Filed Dec. 30, 1963

INVENTOR.
FOY McCULLOUGH, JR.
BY
P. H. Firsht
ATTORNEY.

Aug. 24, 1965　　　F. McCULLOUGH, JR　　　3,202,386
AERIAL CARGO DELIVERY DEVICE
Filed Dec. 30, 1963　　　　　　　　　　　　2 Sheets-Sheet 2

INVENTOR.
FOY MC CULLOUGH, JR.
BY
ATTORNEY.

United States Patent Office 3,202,386
Patented Aug. 24, 1965

3,202,386
AERIAL CARGO DELIVERY DEVICE
Foy McCullough, Jr., 61 Ticonderoga, China Lake, Calif.
Filed Dec. 30, 1963, Ser. No. 334,674
6 Claims. (Cl. 244—138)
(Granted under Title 35, U.S. Code (1952), sec. 266)

The invention described herein may be manufactured and used by or for the Government of the United States of America for governmental purposes without the payment of any royalties thereon or therefor.

The present invention relates to improvements in aerial cargo delivery systems, and more particularly to a device which functions to reduce descent rate, to a rate below the rate of free-fall, for air-dropped cargo and, additionally, functions as an impact shock absorbing mechanism, whereby the cargo may be landed substantially free of landing-shock initiated damage.

Those concerned with development of cargo air-drop delivery systems and techniques have long recognized a need for means which afford a practical increase in cargo descent rates over that obtainable when utilizing conventional cargo parachutes, and, which will permit cargos to be accurately and effectively delivered undamaged to preselected points from airborne vehicles, such as, for example, cargo aircraft and rocket propelled missiles.

The circumstances under which a cargo air-drop must be resorted to for delivering materials are numerous and well-known, however, in most instances an air-drop is used to supply materials to areas inaccessible by surface route. Heretofore, it has been the practice to deliver vitally needed supplies of various kinds by utilizing aircraft for transporting a cargo of supplies above an impact area or drop zone, then ejecting the cargo with an attached parachute, which functions to reduce the cargo's descent rate so that the supplies may be retrieved in a substantially undamaged condition. This technique has met with various levels of success. However, where a chosen impact area is of limited size, or where wind direction and velocity is unfavorable, serious mishaps will oftentimes occur, whereup the air-dropped cargo will not impact at the desired impact area.

In order for a cargo attached parachute to open and effectively retard the descent of the cargo, to thus alleviate supply damage on impact, the cargo must be ejected from comparably great heights. Dropping cargo from great heights enhances likelihood of delivery failure as wind currents tend to engage the parachutes and drag the cargo away from a selected impact area or drop zone before impact. If smaller parachutes are utilized so that a greater rate of cargo descent is realized, the cargo is subjected to increased shock at the moment of impact, thus inherently increasing the probability of supply damage. To reduce shock effects present at impact, efforts have been made to combine shock absorbers with air-dropped cargos, or the cargo's landing structure. However, the heretofore utilized shock absorbing systems are not considered to be completely satisfactory as they employ devices and techniques entailing the use of expensive, heavy, complex, and intricate mechanisms. Therefore, the known devices and systems have certain inherent disadvantages, which in many instances render them economically non-feasible and otherwise unsatisfactory for routine air-drop operations.

Therefore, the purpose of the present invention is to provide an economic, compact, light-weight, and simplified device which permits cargo to be delivered from airborne vehicles with accuracy and effectiveness.

An object of the present invention is to provide an economically feasible cargo delivery device capable of reducing rate of descent, below that of free-fall, while accommodating an increase above that obtainable through the use of conventional parachutes for air-dropped cargo and substantially reducing probability of shock imposed damage at time of cargo impact.

Another object is to provide a device for aerial cargo delivery systems in which the components are commonly utilized to provide aerodynamic drag and a shock absorbing function in aerial cargo delivery operations.

A further object is to provide a device which accommodates an effective increase in cargo descent rates over that practically obtainable through the use of conventional cargo descent retarding parachutes.

Other objects, features and many of the attendant advantages of the invention will become apparent from the following detailed description of the invention when considered in conjunction with the accompanying drawings wherein.

Figure 1:
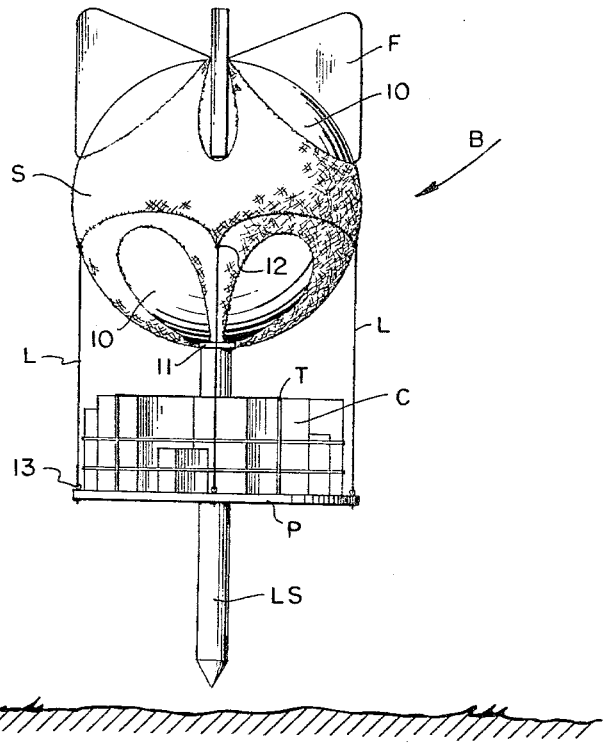
FIG. 1 is a side view of a descending aerial cargo delivery device, as provided for in the instant invention, illustrating the device's component disposition just prior to cargo impact with the ground.

Referring now more specifically to the drawings, wherein like reference characters designate like or corresponding parts through the several views, there is shown in FIG. 1 an inflated balloon, generally designated, B, having a shroud S for supporting a cargo C arranged on a cargo support member or platform P and secured thereto by suitable tie-down members T. The platform P is supported by means of a plurality of support lines L secured to the shroud S. A landing spike LS is provided to extend through the cargo and platform and functions to strike an impact area as will hereinafter be more fully described.

The balloon B comprises collapsible drag member 10, which may be formed of any suitable flexible material capable of being sealed and subsequently inflated to assume and maintain a generally spherical configuration. When desired, a plurality of aerodynamic fins F may be formed as an integral part of member 10 and provided in order to lend stability to the balloon during its descent.

In order to form a support for the cargo platform P, the shroud S is formed of a suitable light-weight material and may, as shown in FIG. 1, comprise a well-known net secured about the member 10 by any suitable means, such as, for example, a securing ring 11. The shroud S is necessarily provided with means for attaching the support lines L thereto. Such means include conventional net reinforcing eye members 12 fastened to the shroud so as to provide reinforced portions therefor. For attaching lines L to the platform P, an arrangement may be provided utilizing eye-bolts 13 through which the support lines L are passed and secured. Hence, it is to be understood that the cargo C supported on the platform P is to be supported in a suspended fashion below the member 10 during its descent to a preselected impact area.

Figure 2:
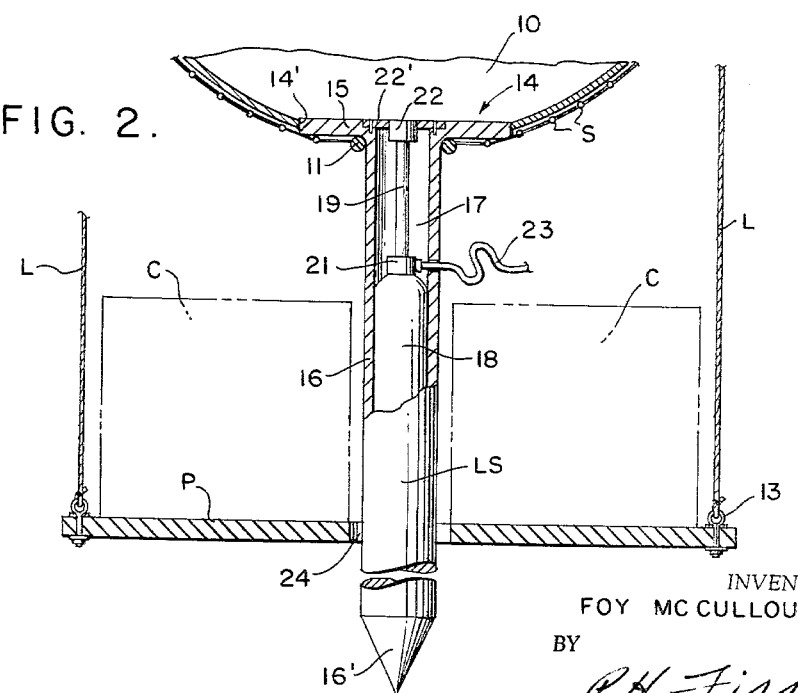
FIG. 2 is a partial schematic view of the device shown in FIG. 1, illustrating a typical embodiment of the present invention.

Turning now to FIG. 2, the lowermost portion of the drag member 10 is provided with an opening 14 within which there is sealed, at the opening's peripheral portion 14', a flat-surfaced pressure plate 15. The plate 15 is secured, by welding or other suitable means, to the uppermost end of the landing spike LS with its uppermost surface being in communication with the interior portion of the drag member 10. Inflating fluid or gas may be introduced into the member through the plate 15 to cause the member 10 to become inflated. As the member 10 is inflated, gas pressures act directly on the uppermost surface of plate 15 for forcing the landing spike LS downwardly through the platform P into a fully extended impact disposition.

The landing spike LS is provided with a body 16 and terminates at a lowermost impact end or element 16'. The uppermost end of the body of the landing spike LS may be machined to form a cavity 17 dimensioned so as to receive and support a small compressed gas capsule 18 of a capacity sufficient to provide the necessary quantity of gas for inflating the member 10. The capsule 18 communicates with the interior of the member 10, through any suitable connecting means, such as, for example, a conduit or tube 19 which is connected with the capsule 18 through an "off-on" valve 21. The tube 19 is connected to the member 10 through a suitable "one-way" valve 22, supported in the plate 15 by a suitable plate 22', which affords a one-way passage of gas from the capsule 18 to the interior of the member 10. While the valves 21 and 22 may be of any suitable design, it is preferred that valve 21 be so constructed as to be capable of being turned to its "on" condition after ejection from a delivery vehicle. Where desired, a vehicle secured static line 23 may be passed into the cavity 17 and attached to the valve 21, so that as the member 10 is ejected in a collapsed state from an airborne vehicle, the static line 23 may apply an opening force for opening the valve 21, thus allowing the compressed gas to escape capsule 18 and subsequently expand within the member 10 to initiate an inflation thereof. After the valve 21 is turned "on," the static line 23 is parted in any suitable and conventional manner.

As hereinbefore mentioned, the landing spike LS is forced downwardly through the platform P as the drag member 10 is inflated. In order to accommodate passage of the landing spike LS through the platform P, a suitably dimensioned, vertically extending passageway 24 is formed through the center portion of the platform P to afford a passage of the body 16 of the landing spike LS therethrough, whereby the landing spike's impact element or end 16' may be caused to extend substantially below the platform P as the pressures of expanded gas within the drag member 10 act downwardly on the uppermost surface of the pressure plate 15. It is intended that the surfaces of the passageway 24 slidingly engage the exterior surfaces of the body 16 in order that the landing spike LS may be guided thereby during periods of downward extension and upward retraction through the platform P, for purposes as will hereinafter be more fully understood.

The particular medium utilized for inflating the member 10 may be varied as desired in accordance with various operative conditions and design parameters, however, in order to incorporate a buoyancy factor, a lighter-than-air gas of a type such as helium, for example, may be used for inflating and expanding the drag member 10 in order that it be caused to function as a buoyant member as well as an aerodynamic drag member for the cargo during its descent.

Figure 3:
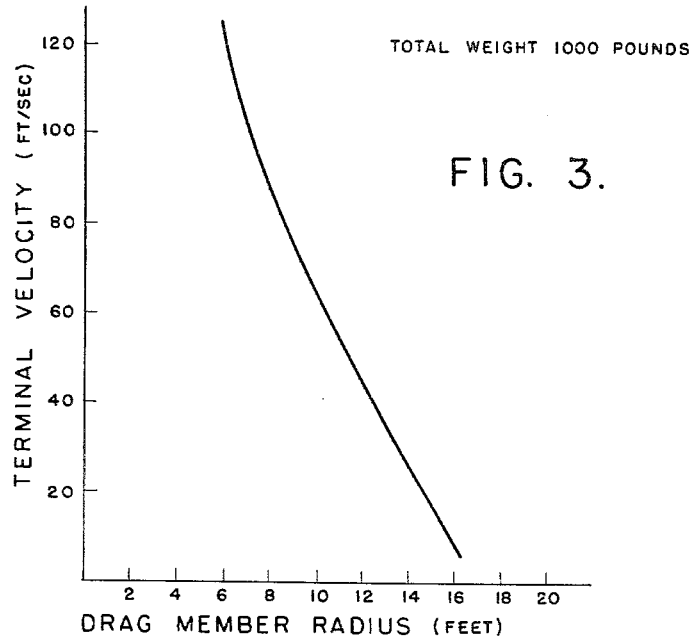
FIG. 3 is a graphic view illustrating cargo terminal velocity as a function of drag member radius.

It is entirely possible to determine the cargo's terminal velocity, or the velocity at which a given load or cargo will impact. Where a spherical drag member of a given diameter is utilized, graphs of the type illustrated in FIG. 3 may be developed and utilized for selecting a spherical drag member of proper size for a given cargo load. While buoyancy characteristics of specific gases utilized for inflating the member 10 may vary the effects of the drag member an equation expressing the terminal velocity, V term, as a function of drag member's radius may be expressed as follows:

$$V \text{ term} = \sqrt{\frac{2w}{C_d r^2 \varphi a} - \frac{8gr}{3C_d}}$$

where
$r$ = radius of the inflated sphere;
$w$ = total weight of the entire device plus the weight of the cargo;
$g$ = acceleration due to the effects of gravity;
$\varphi a$ = ambient air density; and
$C_d$ = aerodynamic drag coefficient of the drag member.

Assuming, for purposes of explanation, that $w=1000$ pounds, $g=32.2$ feet per second$^2$, $\varphi a = 2.3 \times 10^{-3}$ slugs per feet cubed at sea level, and $C_d = .45$ for a sphere, use of the aforementioned equation will provide a series of terminal velocity values, V term, for various balloon radius dimensions. Thus values may be derived and plotted so that a curve, of the type illustrated in FIG. 3, may be constructed and, in operation, be used as a reference for selecting a properly dimensioned drag member for any given cargo load.

In addition to functioning as a drag member, the member 10 further functions as a component of a cushioning means for absorbing impact shock, as the cargo C impacts at a preselected impact area in order that the cargo may be delivered in a substantially damage-free condition.

As the cargo descends, its terminal velocity is limited by the drag effects imposed through the member 10, and upon impact, the cargo's destructive potential and translational energy is effectively converted and stored in the gas utilized to inflate the member 10. As the cargo approaches the impact area, the landing spike LS strikes the impact area, or ground, and is then forced upwardly or retracted through the passageway 24. As the cargo C continues to descend, after the landing spike strikes the ground, the pressure plate 15 acts against the inflating gas of the member 10 to cause it to undergo compression.

The gas within the member 10 is caused to be compressed as a result of the plate 15 being forced upwardly thereagainst as relative movement between the cargo and the landing spike LS occurs. Hence, when the cargo finally makes contact with the ground, the total energy of the system will have been converted to work done on the gas in adiabatically compressing it from a first pressure ($P_0$) and a first volume ($V_0$) to a final pressure ($P_f$) and a final volume ($V_f$).

The total energy of the system may be computed according to the equation $E = \frac{1}{2}(w/g)V^2_{\text{term}} + wL$, where L comprises the landing spike's effective length. The final volume $V_f$ may be related to the landing spike's length L and the cross sectional surface area S of the plate 15 according to the equation $V_f = V_0 - LS$.

The work W done by the plate 15 in compressing the gas within the member 10 may be computed according to the equation $$W = \frac{P_0 V_0}{1-h}(F^{1-h} - 1)$$

where $$F = 1 - \frac{LS}{V_0}$$

and $h$ = the ratio of specific heats of gas. Hence, it is to be understood that it is possible to predetermine the quantity of a given device's total energy at the moment of impact, and to further determine the quantity of this total energy that will be converted by compressing the gas within the member 10. Such determination insures that a balloon member 10 may be selected so that it is "matched" with a given cargo load weight in order that the cargo may be delivered in a substantially undamaged condition. Further, in order to ensure an effectual delivery, a relief valve, not shown, may be provided to allow the gas to escape from the member 10 at an instant of maximum gas compression in order to reduce the likelihood of delivery of energy back to the cargo, i.e., create a "bounce" effect.

In many instances the type and size of the cargo being air-dropped may permit a use of variously modified devices. For example, a device having a shroud integrally formed with the drag member may be utilized, or, if desired, a separate shroud member 30, FIG. 4, may be secured about the member 10 through any suitable securing means such as, for example, a well-known zipper 31.

Figure 4:
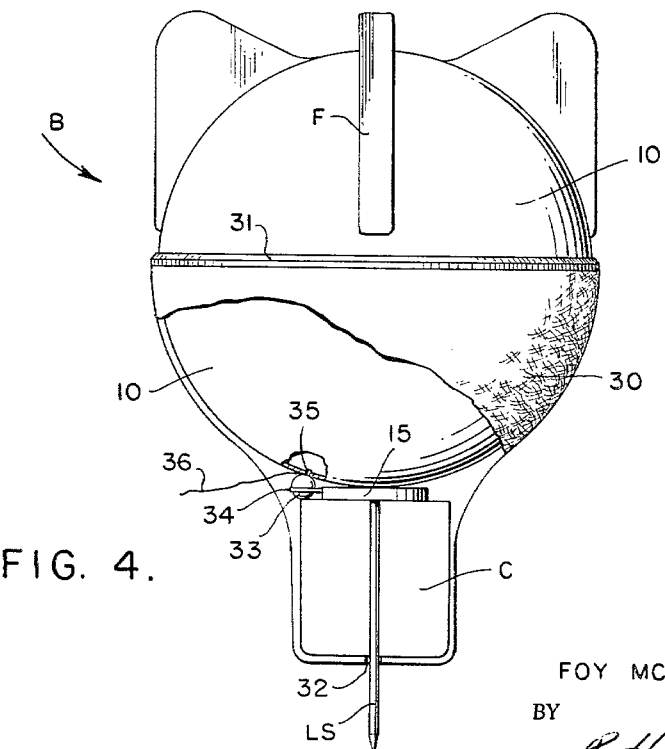
FIG. 4 is a partial diagrammatic view of a modification of the device of FIG. 1.

In this embodiment of the invention, as illustrated in FIG. 4, the shroud 30 also functions as a support or platform for the cargo C and is provided with an opening 32, through which the landing spike LS is permitted to extend beneath the cargo in an impact attitude. The shroud 30 affords a simplified means for connecting the landing spike LS and its pressure plate 15 to the member 10, since the plate 15 may be positioned adjacent the member 10 and held in place relative to the member by the cargo C and the shroud 30.

For inflating the member 10, as shown in FIG. 4, a pressurization bottle 33 may be secured to the pressure plate 15 through any suitable means, such as straps 34, and connected with the member 10 by suitable means including a valve 35, which is to be operated by a static line 36 in a manner similar to that as hereinbefore described with respect to the description of the valve 21.

Further, it is to be understood that it may be deemed desirable to provide a perforated pressure plate, not shown, mounted through suitable means which permit the holes of the plate to communicate with interior portion of the member 10 in order that the gas may be forced through the holes of the plate as the landing spike is forced upwardly in order to utilize frictional forces for performing shock absorbing functions. As this system forms no part of the claimed invention, a detailed description thereof is omitted in the interest of brevity.

In an aerial cargo delivery operation, a balloon B having a collapsed and inflatable drag member 10, a cargo support platform, and a landing spike LS is assembled and associated with a given cargo C. The cargo C is arranged and secured on the platform so as to permit a "free" or unobstructed movement of the landing spike LS through the cargo and the platform. While the drag member 10 is in a collapsed state, a static line is connected to extend between the control valve, of a compressed gas container associated with the member 10, and an aerial delivery or transport vehicle, which is to transport the cargo to a preselected drop zone. Once the vehicle is in a desired position relative to the impact area or the drop zone, the collapsed balloon B and its associated cargo C may be ejected from the transport vehicle so that the static line is caused to exert a valve-opening force on the control valve, whereupon compressed gases are allowed to escape from the gas container into the interior of the drag member 10. The gas now causes the member 10 to assume an inflated state. As the member 10 assumes its inflated state, the expanding gases act to force the landing spike LS downwardly to position its impact end in a fully extended impact attitude or disposition. Upon becoming fully inflated, the member 10 functions as an aerodynamic drag for the cargo to limit its terminal velocity to a predetermined value. When the impact end, or element, of the landing spike LS impinges against the surface of impact area, the landing spike is forced upwardly to exert a compressing force on the gas of the drag member. The volume of the drag member 10 is thereby substantially reduced and the pressure therein is increased so that total translational and potential energy possessed by the cargo ladened device may be converted to work done on the gas, whereby the cargo C may now "settle" to the ground in a substantially un-damaged condition with the forces of impact dissipated therefrom.

Obviously, many modifications and variations of the present invention are possible in the light of the above teachings. It is therefore to be understood that within the scope of the appended claims the invention may be practiced otherwise than as specifically described.

What is claimed is:

1. An aerial cargo delivery device for air-dropping a given cargo from an airborne vehicle to an area of impact, comprising:
    a flexible, inflatable aerodynamic drag member;
    means connected with said drag member for causing it to be filled with an expanded gas during descent to assume an inflated condition and to conform to an expanded drag member having a pressurized interior of a predetermined volume;
    a cargo supporting shroud;
    means for securing said shroud to said member;
    a cargo supporting platform;
    means for connecting said platform with said shroud so that the platform may be suspended beneath said member during cargo descent;
    an elongated T-shaped landing spike having an elongated body terminating at a first end defining an impact end and terminating at a second end in a flat surfaced plate member having predetermined dimensions for defining a pressure plate; and
    means for mounting said landing spike within said device in a manner such that the body of said spike passes freely through said platform with the pressure plate being disposed in engagement with said drag member, and the impact end thereof being disposed at a position extending significantly below said platform, whereby during cargo descent the drag member may be fully expanded for controlling rate of cargo descent, and, on impact, function as a shock absorbing device by accommodating relative movement between said drag member and said pressure plate in a drag member gas compressing direction as said impact end of said spike strikes said impact area.

2. The device as defined in claim 1, further characterized in that said gas comprises a lighter-than-air gas.

3. A cargo landing device for delivering falling cargo from an airborne vehicle to a selected point on the ground, comprising in combination:
    a flexible and inflatable aerodynamic drag member having an expandable interior and spherical exterior configuration;
    means defining a periphery of an opening in said member;
    means comprising a pressure plate having a vertical passage therethrough;
    means for disposing said plate in a sealed relationship with the periphery of said opening;
    a one-way valve disposed in said passage so as to form a sealed member when said member is inflated;
    an elongated body secured to said plate having a hollowed center portion communicating with said passage;
    a compressed gas capsule arranged within the center portion of said body and communicating with the interior of said drag member through said one-way valve;
    an on-off control valve interposed between said capsule and said one-way valve for controlling the flow of gas from said capsule to said one-way valve;
    means for turning said on-off valve from an "off" condition to an "on" condition as said member is falling from said vehicle, whereby said member is caused to assume a gas-filled spherical configuration;
    a cargo supporting platform;
    means for securing said cargo supporting platform to said drag member in a manner which affords a substantially friction-free passage of said elongated body through the platform; and
    means defining an impact element secured to said elongated body at a point substantially displaced from said platform and disposed between the ground and said platform when said drag member is inflated, so that as the impact element strikes the ground a relative upward movement is imparted to said pressure plate for causing said pressure plate to act against and compress said gas in said gas-filled member.

4. An aerial cargo delivery device comprising
an inflatable aerodynamic drag member;
a cargo supporting shroud secured to said drag member;
a vertically arranged landing spike so disposed as to pass downwardly through said shroud and terminate at a lowermost impact end;
means defining a pressure plate secured at the uppermost end of said landing spike and disposed adjacent said drag member;
drag member inflating means secured to said pressure plate for introducing an inflating medium into said member for thus initiating an inflation thereof; and
means for activating said drag member inflating means as said member is ejected from an airborne vehicle so that the drag member may be inflated and exert an aerodynamic drag effect on said platform as it descends, and further function as a shock absorbing mechanism as the impact end of said landing spike strikes the ground for thus causing said pressure plate to act against said medium.

5. A free-fall cargo delivery device for use in delivering cargo from airborne transport vehicles in free-fall descent to selected impact areas located at the ground comprising, in combination:
a flexible and hermetically sealed, balloon-like member adapted to be deflated to assume a compact configuration and to be inflated to assume an expanded, high-drag aerodynamic configuration;
a cargo support means adapted to receive and support a selected cargo during free-fall descent;
suspension means connecting said cargo support means with said member in a manner such that cargo supported by said support means during free-fall descent may be suspended from said member in displaced relationship therewith;
a member inflating fluid;
a positively pressurized vessel adapted to confine said fluid under positive pressure;
an operable vessel discharge means including a discharge means activating valve and fluid conduit means communicating with the pressurized vessel and the interior portions of said member adapted to be activated for causing the inflating fluid to be discharged under positive pressure from said vessel and introduced within said balloon-like member through said discharge means for thus causing the member to be inflated to assume a high-drag configuration during initial free-fall descent;
means connected with the valve of said vessel discharge means adapted to actuate said valve means as the member and cargo are ejected for initial free-fall descent from an airborne vehicle for thereby causing said discharge means to be activated and said member to be expanded during free-fall descent for thus causing said member to exert an aerodynamic drag effect on cargo supported by said cargo support suspended therefrom; and
a rigid shock transfer element having one end disposed in contiguous engagement with selected surfaces of said balloon-like member and arranged in a manner such that the element during descent is caused to extend downwardly and terminate in an impact portion located substantially below said cargo support as it is suspended from said member, whereby as the impact portion of the element is caused to strike the ground, impact shock thus encountered may be transferred through said element to said member and attenuated thereby while the cargo support remains suspended therefrom.

6. In an aerial cargo delivery device for delivering falling cargo to the ground, means comprising:
a flexible drag member so formed as to accommodate an inflation thereof for causing said member to expand and assume a flexible spherical configuration;
an inflating medium;
means connected with said drag member adapted to introduce said medium into said member, whereby the member may be expanded to impart an aerodynamic drag effect to retard rate of descent for a falling cargo associated therewith in suspended relationship;
a vertically aligned, elongated body disposed within the device and adapted to pass freely in vertical directions through the falling cargo suspended from the drag member;
a pressure plate secured to the uppermost end of said body so adapted and arranged as to be disposed adjacent said member in a manner such that upward movement of said body relative to the cargo causes said plate to act against and compress said inflating medium introduced into said member; and
means defining an impact component arranged at the lowermost end of said body in an interposed relationship between the cargo suspended from the drag member and the ground so that as said impact component is caused to strike the ground the elongated body is forced upwardly through the suspended cargo causing the plate to act against and compress the inflating medium in advance of cargo impact with the ground, whereby shock of impact is transmitted to said inflating medium and the cargo is allowed to impact in a substantially shock-free manner.

References Cited by the Examiner

UNITED STATES PATENTS 2,958,487  11/60  Fraebel _____ 244—138

FOREIGN PATENTS 925,415  5/63  Great Britain.

MILTON BUCHLER, *Primary Examiner.*
FERGUS S. MIDDLETON, *Examiner.*